United States Patent [19]
Danelski

[11] Patent Number: 5,812,986
[45] Date of Patent: Sep. 22, 1998

[54] RF LIGHT DIRECTED INVENTORY SYSTEM

[76] Inventor: Darin L. Danelski, 249 Johnston Dr., Dousman, Wis. 53118

[21] Appl. No.: 604,804

[22] Filed: Feb. 23, 1996

[51] Int. Cl.$^6$ ..................................................... G06F 7/00
[52] U.S. Cl. ............................................................. 705/22
[58] Field of Search ............................................. 705/22

[56] References Cited

U.S. PATENT DOCUMENTS

| | | | |
|---|---|---|---|
| 4,002,886 | 1/1977 | Sundelin | 235/61.7 R |
| 4,500,880 | 2/1985 | Gomersall et al. | 340/825.35 |
| 4,962,466 | 10/1990 | Revesz et al. | 364/518 |
| 5,260,694 | 11/1993 | Remahl | 340/674 |
| 5,348,485 | 9/1994 | Briechle et al. | 439/110 |
| 5,505,473 | 4/1996 | Radcliffe | 280/79.2 |

OTHER PUBLICATIONS

Hitchcock, Nancy, "Paperless picking increases productivity by over 300%," Modern Materials Handling, v. 48, No. 8, p. 20(30), Jul. 1993.

Burrows, Gary, "No gags in Spencer's distribution," American Shipper, V. 36, No. 6, p. 56(2), Jun. 1994.

*Primary Examiner*—Edward R. Cosimano
*Assistant Examiner*—Philip Groutt
*Attorney, Agent, or Firm*—Donald J. Ersler

[57] ABSTRACT

An RF light directed inventory system includes a host computer, a host RF transmitter/receiver, at least one RF processor panel, and a plurality of light directed modules. The host computer receives a customer order. The customer order contains a plurality of SKU numbers with item quantities which are converted into a light directed module address. The plurality of light directed module addresses and corresponding quantities are assigned an RF process panel address. The plurality of light directed module addresses, item quantities and RF process panel addresses are converted into a plurality of serial data packets. Each serial data packet is transmitted to one RF processor panel. The serial data packet is input by the RF processor panel and decoded into a plurality of light directed module addresses and item quantities. The item quantities will be displayed on each light directed module. After servicing the proper quantity of items, an inventory specialist will press a button on the light directed module which indicates that all items have been serviced. When the RF processor panel has determined that each bin location has been serviced, the RF processor panel will send a message to the host computer that all the bin locations have been serviced. When the host computer receives a message from all the RF processor panels, the host computer will be ready to send another customer order.

20 Claims, 8 Drawing Sheets

RF LIGHT DIRECTED INVENTORY SYSTEM

BACKGROUND OF THE INVENTION

1. Field of the Invention

The present invention relates generally to light directed inventory systems and more specially to a Radio Frequency light directed inventory system which utilizes a Radio Frequency (RF) link to communicate between a host computer and light directed modules.

2. Discussion of the Prior Art

Light directed inventory systems are fairly common where a large number of inventory items are required to fill a customer order. In the most simple form, a light directed inventory system will consist of a host computer, at least one zone controller, a plurality of subcontrollers, a plurality of light directed modules, and a multitude of wire connections between them. A customer order will be received by the host computer. The host computer organizes the customer order according to light directed module address and item quantity. The light directed module address and item quantity is sent to a zone controller which in turn sends the module address and item quantity to a subcontroller. Every bin location has a corresponding light directed module. The subcontroller will send the quantity of items to each light directed module. The light directed module will display the number of items to be picked from the bin location or put into the bin location. The word service will be used to describe the action of picking items from a bin location or putting items into a bin location, henceforth. An inventory specialist is sent to service the items from each bin location to complete a customer order. After servicing the proper quantity at each bin location, the inventory specialist presses a task complete button on the light directed module which indicates that items in the bin location have been serviced. The software in the host computer checks all locations of light directed modules for completion of the customer order. When all bins haven been serviced, the host computer will be ready for another customer order.

The problem with the prior art light directed inventory systems is the multitude of wire connections required to make a large system operable. Not only are the number of wire connections a problem, but the wire connections must also be installed and maintained. Further, a number of different hardware items are also needed besides the host computer and light directed modules. A typical system will require numerous zone controllers and subcontrollers.

Accordingly, there is a clearly felt need in the art for a RF light directed inventory system that has fewer wire connections, fewer hardware items, and which is easier to install and maintain than the prior art light directed inventory systems.

SUMMARY OF THE INVENTION

The primary objection of the present invention is to provide a RF light directed inventory system that has fewer wire connections, fewer hardware items, and which is easier to install and maintain than the prior art light directed inventory systems.

According to the present invention, a RF light directed inventory system includes a host computer, a host RF receiver/transmitter, at least one RF processor panel, and a plurality of light directed modules. Each RF processor panel includes a panel RF receiver/transmitter and a processor board. Each light directed module has a corresponding bin location. The host computer receives a customer order. The customer order contains a plurality of SKU numbers (inventory numbers).

Each SKU number has an item quantity and each SKU number is converted into a light directed module address. Each light directed module address and item quantity are then organized according to a RF processor panel address.

The plurality of light directed module addresses, item quantities and the RF processor panel addresses are converted into a plurality of serial data packets, respectively. There is at least one RF processor panel address per RF light directed system, and there is also one serial data packet for each RF processor panel. Each serial data packet is transmitted to each RF processor panel, respectively. The serial data packet is input by the RF processor panel and decoded into a plurality of light directed module addresses and corresponding quantities.

There are two variations of light directed modules. The first type of light directed module is a display based module which has a quantity box where the quantity of items to be serviced are displayed. The second type is a light based module which has a light that indicates that items are to be serviced from a particular bin location. The quantity to be serviced is displayed in a separate quantity display device.

With the display based module, each corresponding quantity is sent to the light directed module address, respectively. An inventory specialist services the items at each bin location. The quantity of items to be serviced is displayed on each light directed module. After servicing the proper quantity of items, the inventory specialist will press a task complete button on the light directed module which indicates that all items have been serviced. From henceforth, a display based module will be referred to as a light directed module.

With the light based module, the item quantity is sent to the quantity display device. The light display on the light based module is lighted and an inventory specialist services the items at each bin location. After servicing the proper quantity of items, the inventory specialist presses a task complete button on the light based module which indicates that all items have been serviced. The light display on another light based module will light up and a new item quantity will appear on the quantity display device. This process will repeat until all bin locations have been serviced.

The software in each RF processor panel, checks either the light based module or display based modules to see if the task complete button has been depressed. When each RF processor panel has determined that each bin location has been serviced, the RF processor panels will send a message through the host RF receiver/transmitter to the host computer that all the bin locations have been serviced. When the host computer receives messages from all RF processor panels, the host computer will be ready to send another customer order.

The RF light directed inventory system may also be used to organize batch inventory orders. A host computer instructs at least one RF processor panel to send quantity information to a plurality of light directed modules. The inventory specialist takes items from the batch inventory order and services the items at bin locations corresponding to each light directed module.

One further feature of the RF light directed inventory system is the ability to connect a bar code scanner or printer to the RF processor panel. The bar scanner may scan any item into the host computer which has a bar code. The printer can print out any message sent to it from the host computer.

Accordingly, it is an object of the present invention to provide an RF light directed system which requires less wire connections then that of the prior art.

It is a further object of the present invention to provide an RF light directed system which requires the use of fewer hardware items then that of the prior art.

Finally, it is another object of the present invention to provide an RF light directed system which is easier to install and maintain because of less wire connections then that of the prior art.

These and additional objects, advantages, features and benefits of the present invention will become apparent from the following specification.

DETAILED DESCRIPTION OF THE PREFERRED EMBODIMENTS

Figure 1:
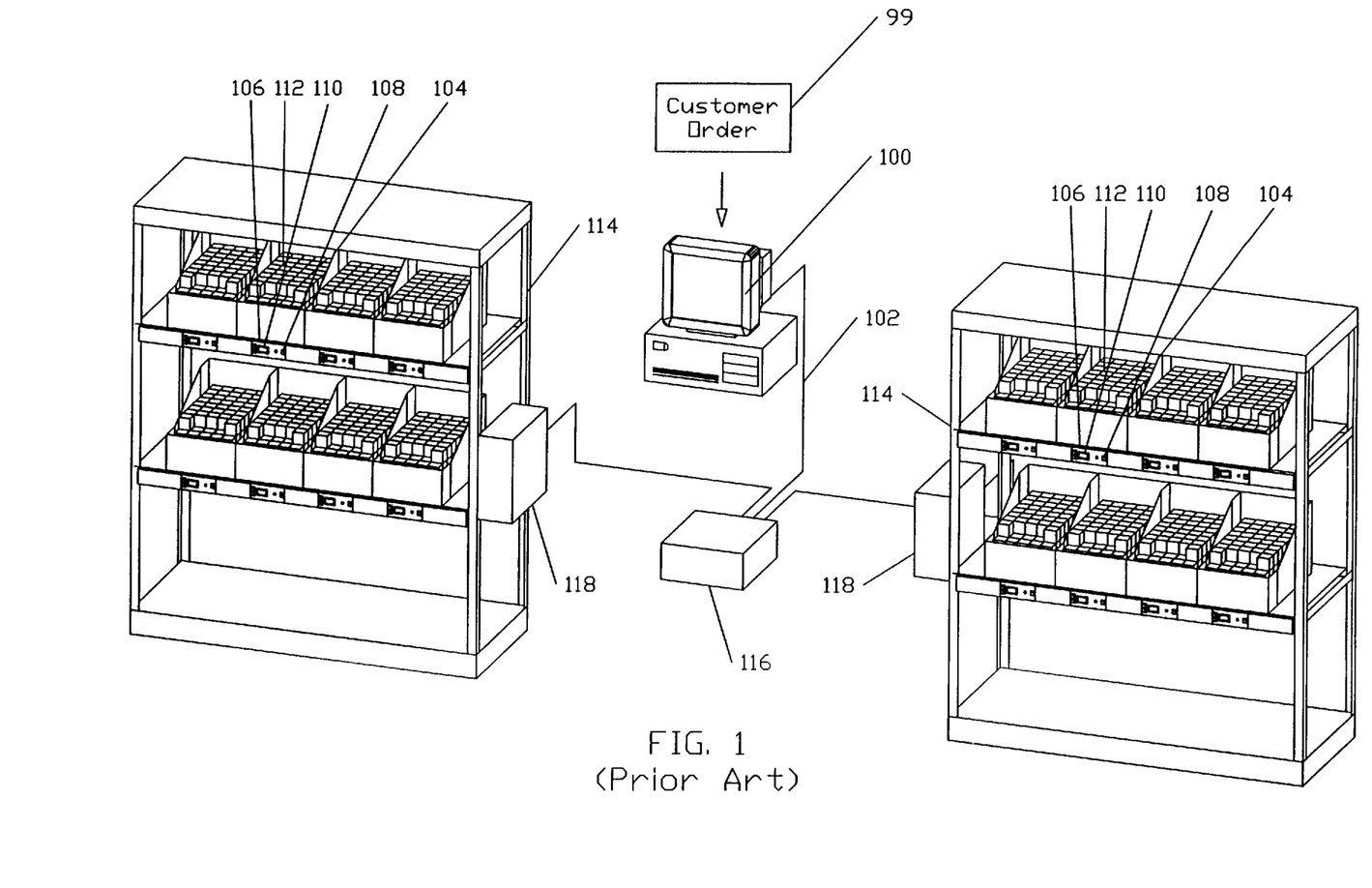
FIG. 1 is a perspective view of a prior art light directed inventory system.

With reference now to the drawings, and particularly to FIG. 1, there is shown a perspective view of a prior art light directed inventory system. A host computer 100 inputs a customer order 99. The host computer 100 organizes the customer order according to light directed module address and item quantity. The light directed module address and item quantity are sent through a wire connection 102 to a zone controller 116 which in turn sends the light directed module address and quantity to a subcontroller 118. The subcontroller 118 will send the quantity of items to each light directed module 106, respectively. Each light directed module 106, corresponds to a bin location 104, respectively. Rack 114 contains a plurality of bin locations 104. The quantity of items to be serviced is displayed in a quantity box 110. After items 112 have been serviced at the bin location 104, a task complete button 108 is depressed. After every task complete button 108 is depressed on every light directed module 106, the host computer 100 will be ready to process another customer order.

Figure 2:
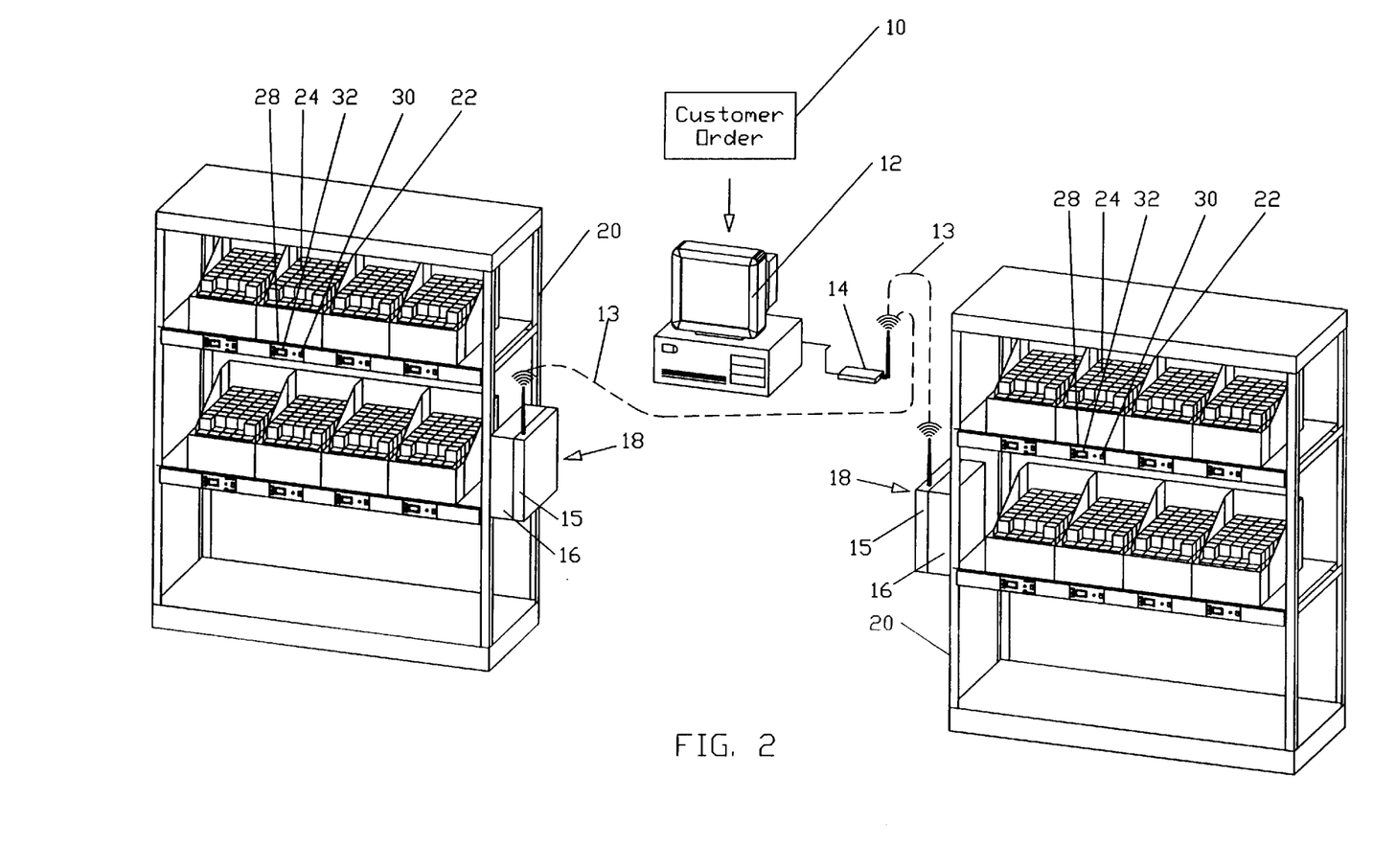
FIG. 2 is a perspective view of an RF light directed inventory system in accordance with the present invention.

FIG. 2 shows a perspective view of a RF light directed inventory system in accordance with the present invention. The RF light directed inventory system 1, comprises a host computer 12, a host RF receiver/transmitter 14, a RF processor panel 18, and a plurality of light directed modules 28. Each RF processor panel 18 comprises a panel RF receiver/transmitter 15 and a processor board 16.

Preferred software is given by way of example for the host computer 12 and not by way of limitation. With reference to the host computer software execution flow chart in FIG. 3, a customer order 10 at process block 34 is input into the host computer 12. The host computer 12 may input the customer order 10 from another computer, a floppy disk drive, or through other data transfer methods. At decision block 36, the previous customer order must be complete before the customer order at process block 34 can be processed. At process block 38, the SKU numbers located in the customer order 34 are converted into light directed module addresses. Each light directed module address has a item quantity which indicates the number of items 24 to serviced at the bin location 22, respectively. A plurality of bin locations 22 are contained within rack 20. The host computer 12, can be any personal computer.

Figure 3:
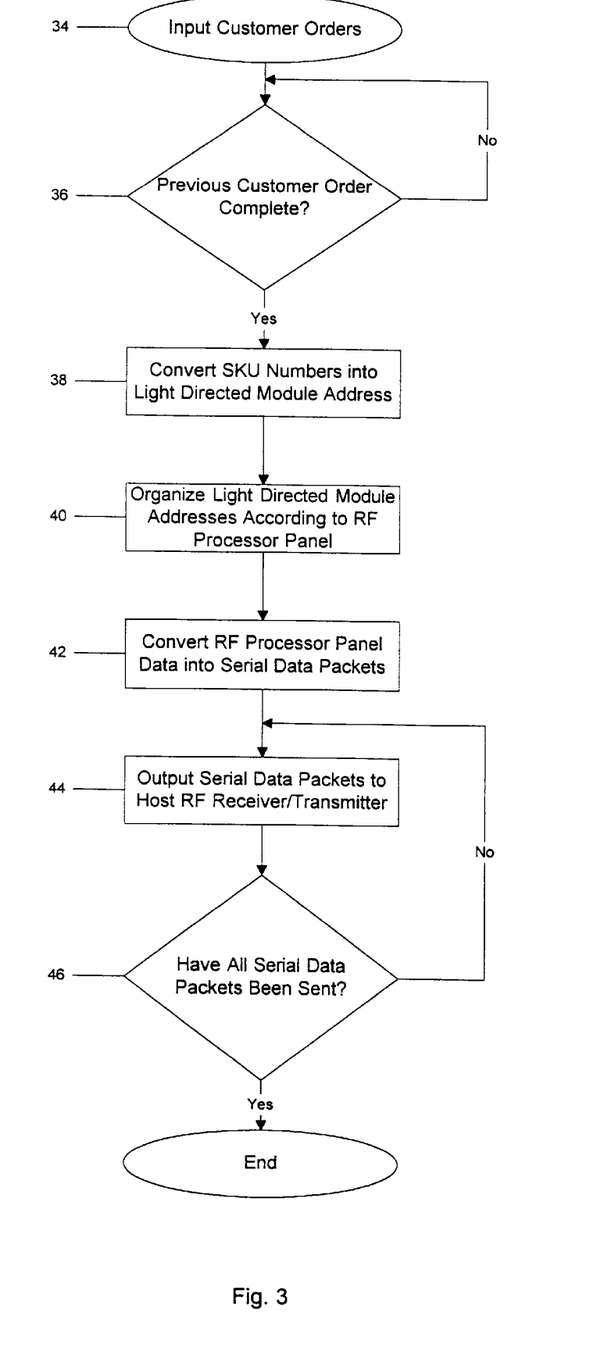
FIG. 3 is a flow chart of a program executed by a host computer shown in FIG. 2 in accordance with the present invention.

The light directed module addresses are organized according to RF processor panel 18 in process block 40, each RF processor panel 18 has an address. The data of light directed module addresses, RF processor panels addresses and item quantities are converted into serial data packets in process block 42. Each RF processor panel 18 is sent a specific serial data packet, respectively. The serial data packets are transmitted by the host RF receiver/transmitter 14 and received by the panel RF receiver/transmitter 15.

One serial data packet is output to the host RF receiver/transmitter 14 in process block 44. One serial data packet is output to the host RF receiver/transmitter 14 until all have been sent in decision block 46. Communication between the host RF receiver/transmitter 14 and panel RF receiver/transmitter 15 occurs across a RF link 13.

Preferred software is given by way of example for the RF processor panel 18 and not by way of limitation. With reference to the RF processor panel software execution flow chart in FIG. 4, the processor board 16 inputs the serial data packet from panel RF receiver/transmitter 15 in process block 48. The functionality of all light directed modules is checked in decision block 49. If any light directed module 28 is not functional then an error message is sent to host computer 12 in process block 51. If all light directed modules 28 are functional the program continues to process block 50.

Figure 4:
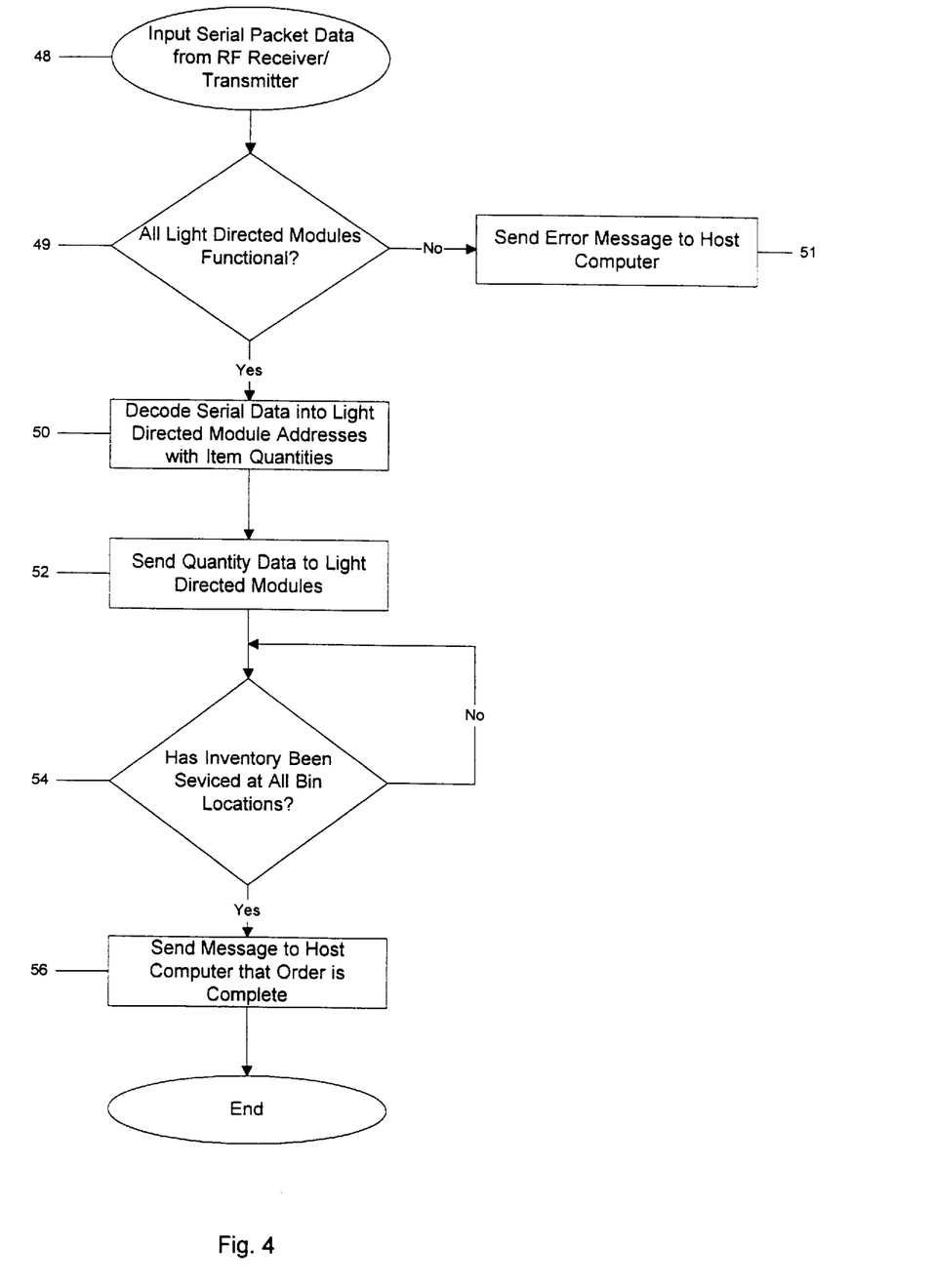
FIG. 4 is a flow chart of a program executed by a RF processor panel shown in FIG. 2 in accordance with the present invention.

In process block 50, the serial data packet is decoded into light directed module addresses, each having an item quantity, respectively. The item quantity indicates items 24 to be serviced at bin locations 22; each item quantity is displayed on each quantity box 32, respectively. The RF processor panel 18 outputs the light directed module addresses with the item quantities to the plurality of light directed modules 28 in process block 52. The quantity of items 24 to be serviced at each light directed module 28 is displayed on a quantity box 32. After servicing the proper quantity of items 24, a task complete button 30 is depressed which indicates that all items have been serviced. The processor board 16 can be any computer motherboard. The light directed module 28 maybe purchased from Innovative Picking Technologies, Inc. of Hartland, Wis.

The message of "order is complete" in process block 56 will not be sent until each RF processor panel 18 has determined that each bin location has been serviced at decision block 54. The RF processor panel 18 will send a message to the host computer 12 through the host RF receiver/transmitter 14 that all the bin locations 22 have been serviced. When the host computer 12 receives messages from all RF processor panels 18, the computer host 12 will be ready to send another customer order as shown in decision block 36, FIG. 3.

Figure 5:
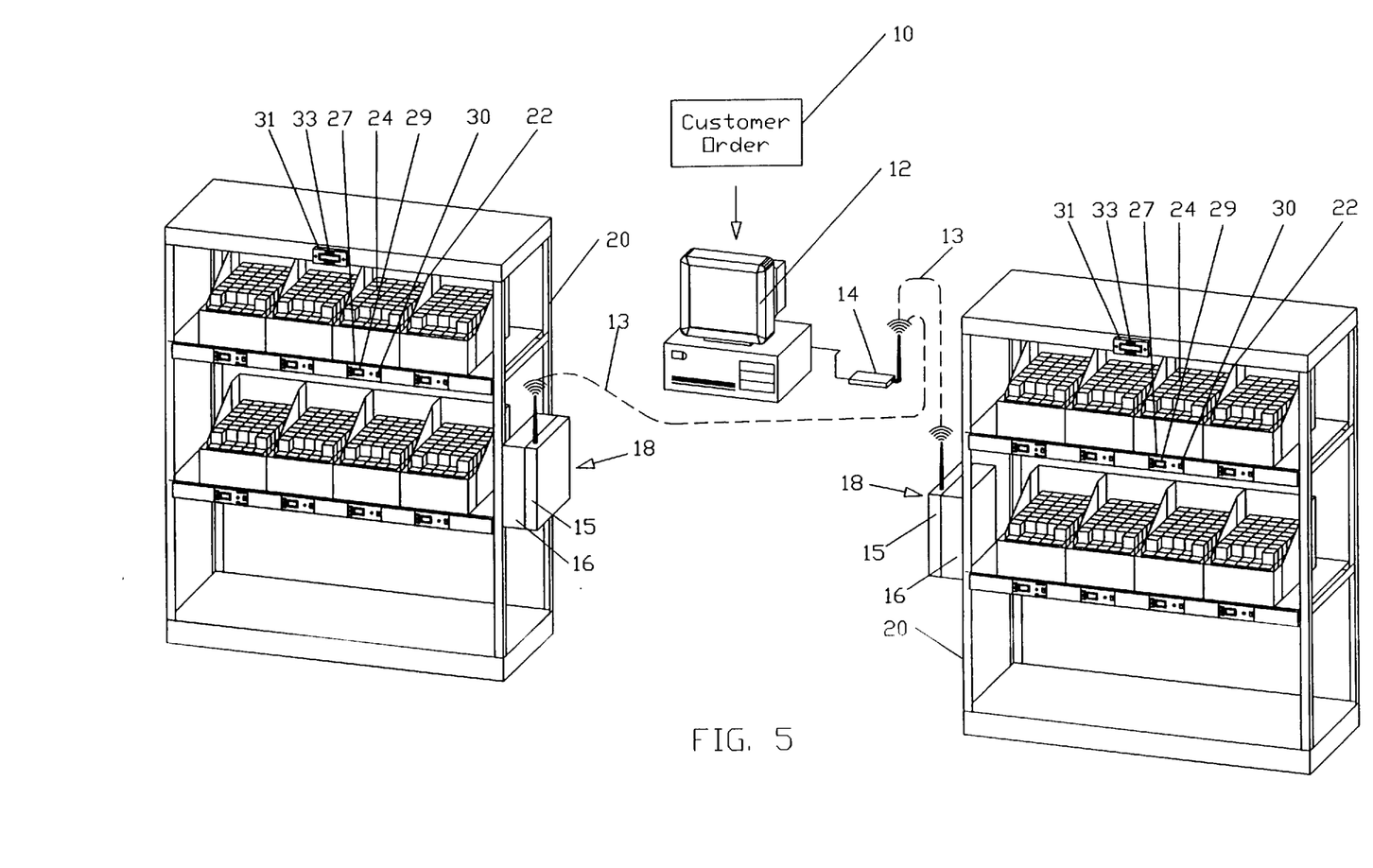
FIG. 5 is a perspective view of a RF light directed inventory system utilizing an light based module in accordance with the present invention.

FIG. 5 is a perspective view of an RF light directed inventory system 1 utilizing a light based module 27. A light based module 27 and a quantity display device 31 are substituted for a light directed module 28. The operation is very similar to that shown in FIG. 2. The RF processor panel 18 decodes a serial data packet into light based module addresses and item quantities. A quantity box 33 on the quantity display device 31 displays the quantity of items 24 to be serviced. A light display 29 on light based module 27, lights up to show which bin location 22 is to be serviced. The task complete button 30 is depressed after the bin location has been serviced. A new quantity will be shown in the quantity box 33 and the light display 29 on a another light based module 27 lights up to show a new bin location 22 to be serviced.

Figure 6:
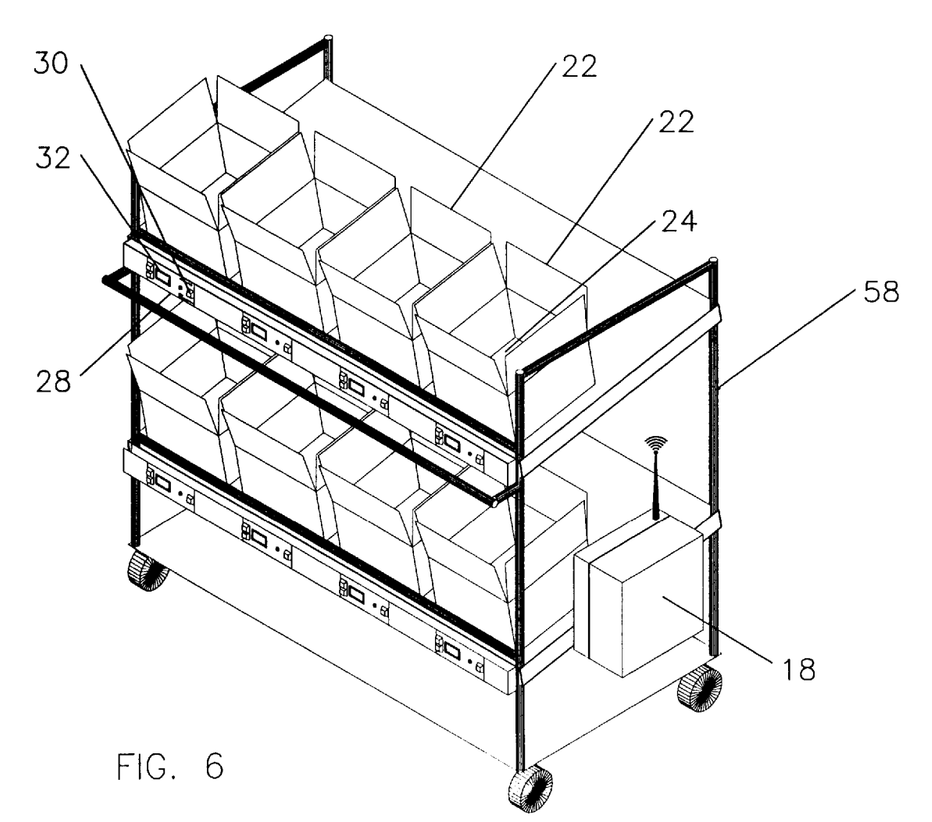
FIG. 6 is a perspective view of a partial RF light directed inventory system in accordance with the present invention.

FIG. 6 is a perspective view of a partial RF light directed inventory system 2. A plurality of bin locations 22, a plurality of light directed modules 28, and a RF processor panel 18 are mounted to a moveable cart 58.

With reference to FIG. 2, the host computer 12 sends the customer order 10 to the host computer 12. Host computer 12 converts the customer order 10 to serial data packets as previously explained and sends the serial data packets to the host RF receiver/transmitter 14. Serial data packets received by the RF processor panel 18 are decoded and output to the plurality of light directed modules 28 as previously explained. After all task complete buttons 30 have been depressed, the host computer 12 will be sent an "order is complete" message. A plurality of partial RF light directed inventory systems 2, may be used with the host computer 12 and the host RF receiver/transmitter 14.

Figure 7:
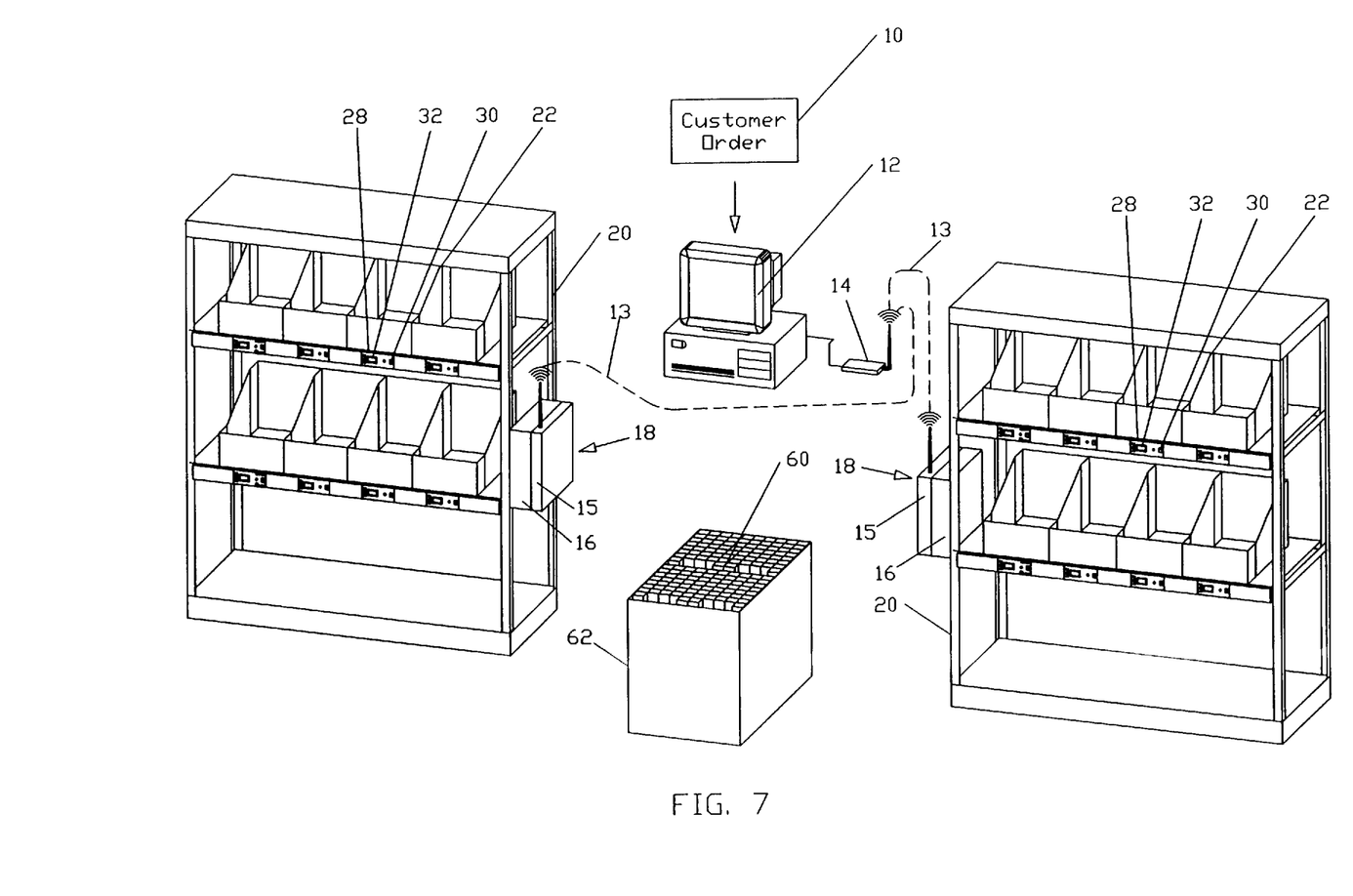
FIG. 7 is a perspective view of an RF light directed inventory system utilized in organizing batch inventory orders in accordance with the present invention.

FIG. 7 is a perspective view of a RF light directed inventory system 1, utilized in organizing batch inventory orders. The quantity box 32, located on each light directed module 28 indicates a quantity of incoming items 60 in an incoming bin 62 that should be placed in each bin location 22, respectively. The task complete button 30 is depressed after the bin location 22 has been serviced.

Figure 8:
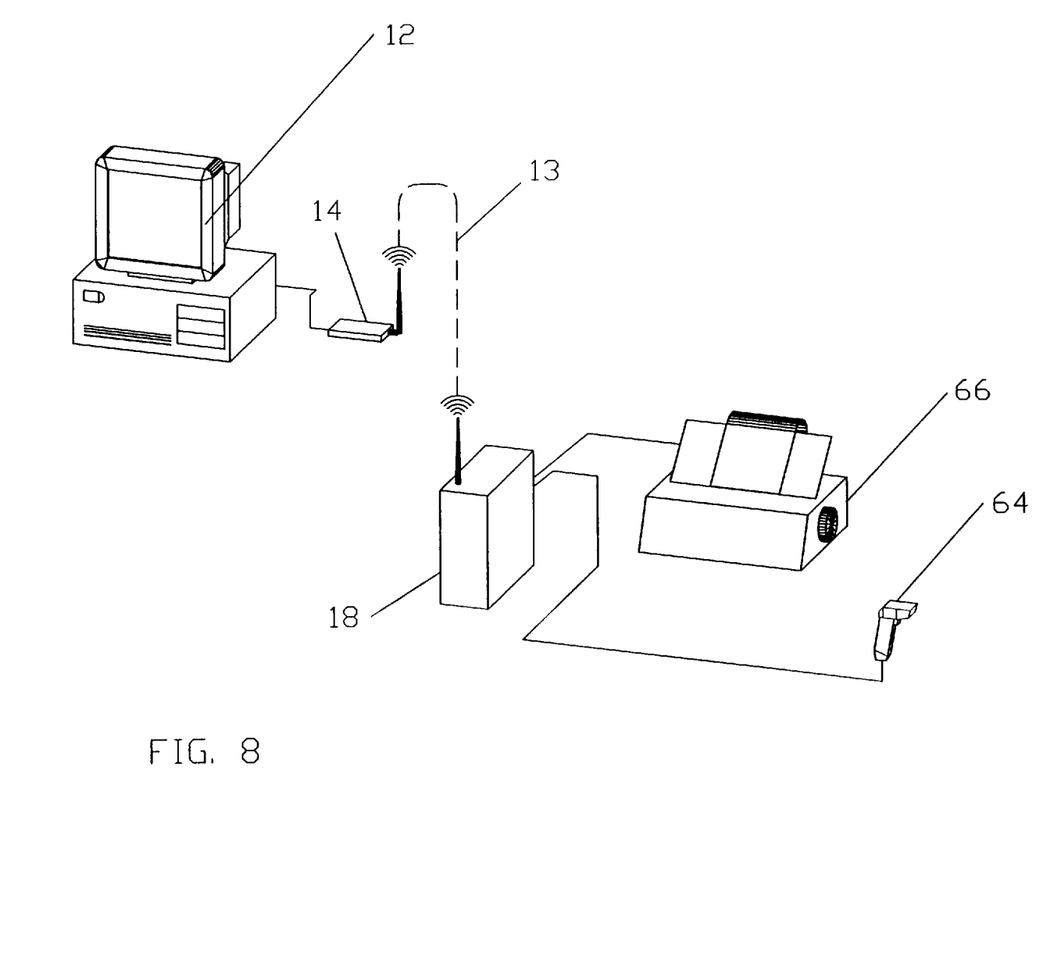
FIG. 8 is a perspective view of a bar code scanner and a printer which may be operated from the RF processor panel in accordance with the present invention.

FIG. 8 is a perspective view of a bar code scanner 64 and a printer 66 which may be operated from the RF processor panel. The bar code scanner 64 may be connected to the RF processor panel 18. The bar code scanner 64 can be used to scan any item with a bar code into the host computer 12. A printer 66 may be connected to the RF processor panel 18. The host computer 12 may print any message from thereof.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

We claim:

1. An RF light directed inventory system comprising:

a host computer;

a host RF receiver/transmitter which communicates with said host computer;

at least one RF processor panel which communicates with said host RF receiver/transmitter, said at least one RF processor panel receiving an order from said host RF receiver/transmitter; and a plurality of light directed modules which communicate with said at least one RF processor panel, wherein a wireless communication existing between said host computer and said plurality of light directed modules, said light directed modules receiving instructions from said RF processor panel in response to an order sent by the host computer, and automatically returning an order complete signal to said host computer via said wireless communication.

2. The RF light directed inventory system of claim 1, wherein:

said plurality of light directed modules which are to be serviced, displaying the number of items to be serviced from said corresponding bin, a button on said light directed modules being pressed when said bin is serviced.

3. The RF light directed inventory system of claim 2, further comprising:

each said light directed module having a light which is turned on when items are to be serviced from a corresponding bin, said light directed module being a light based module.

4. The RF light directed inventory system of claim 1, further comprising:

at least one rack containing said plurality of light directed modules and said corresponding bins.

5. The RF light directed inventory system of claim 1, further comprising:

a bar code scanner being connected to said RF processor panel, wherein said bar code scanner being used to scan an item with a bar code into said host computer.

6. The RF light directed inventory system of claim 1, further comprising:

said RF processor panel receiving an order from said host computer, said RF processor panel decoding said order into a plurality of light directed module addresses and a plurality of item quantities, each said item quantity corresponding to each said light directed module address, wherein no further communication being required between said host computer and said at least one RF processor panel until a new order is received.

7. The RF light directed inventory system of claim 1, further comprising:

a printer being connected to said RF processor panel, wherein said host computer printing a message at said printer.

8. An RF light directed inventory system comprising:

a host computer;

a host RF receiver/transmitter which communicates with said host computer;

at least one RF processor panel which communicates with said host RF receiver/transmitter, each said RF processor panel having a RF receiver/transmitter and an RF processor board, each said RF receiver/transmitter receiving an order from said host RF receiver/transmitter, said RF processor board decoding said order into a plurality of light based module addresses and a plurality of item quantities, each said item quantity corresponding to each said light based module address;

a plurality of light based modules which communicate with said at least one RF processor panel, said plurality of light based modules which are to be serviced emitting light and displaying the number of items to be serviced from a corresponding bin, a button on said light based modules being pressed when said bin is serviced, said RF panel processor sending a communication to said host computer when all light based modules have been serviced, wherein no further communication being required between said host computer and said at least one RF processor panel until a new order is received; and wherein a wireless communication existing between said host computer and said plurality of light directed modules.

9. The RF light directed inventory system of claim 8, further comprising;
   at least one rack containing said plurality of light based modules and said corresponding bins,
   said plurality of light directed modules which are to be serviced, displaying the number of items to be serviced from said corresponding bin, a button on said light directed modules being pressed when said bin is serviced.

10. The RF light directed inventory system of claim 8, further comprising:
    a bar code scanner being connected to said RF processor panel, wherein said bar code scanner being used to scan an item with a bar code into said host computer; and
    a printer, said printer being connected to said RF processor panel, wherein said host computer printing a message at said printer.

11. An RF light directed inventory system utilizing a moveable cart comprising:
    a host computer;
    a host RF receiver/transmitter which communicates with said host computer;
    an RF processor panel which communicates with said host RF receiver/transmitter, said RF processor panel receiving an order from said host RF receiver/transmitter; and
    a moveable cart having a plurality of light directed modules, each said light directed module having a corresponding bin, wherein depression of buttons of every light directed module associated with the order causing an order complete signal to be gent to Said host computer via said RF processor panel.

12. The RF light directed inventory system utilizing a moveable cart of claim 11, wherein:
    said plurality of light directed modules of said cart which are to be serviced displaying the number of items to be serviced, a button on said light directed modules of said cart being pressed when said bin is serviced.

13. The RF light directed inventory system utilizing a moveable cart of claim 12, further comprising:
    at least one rack, each said rack containing a plurality of light directed modules and corresponding bins, each said rack having an RF processor panel which communicates with said host .RF receiver/transmitter, said at least one RF processor panel receiving an order from said host RF receiver/transmitter;
    said plurality of light directed modules of said rack which are to be serviced displaying the number of items to be serviced from a corresponding bin, a button on said light directed modules of said rack being pressed when said bin is serviced;
    wherein transfers between said bins in said rack and said bins in said moveable cart being indicated by the number display of each said light based module.

14. The RF light directed inventory system utilizing a moveable cart of claim 13, further comprising:
    said RF processor panels receiving an order from said host computer, said RF processor panels decoding said order into a plurality of light directed module addresses and a plurality of item quantities, each said item quantity corresponding to each said light directed module address, wherein no further communication being required between said host computer and said at least one RF processor panel until a new order is received.

15. The RF light directed inventory system utilizing a moveable cart of claim 13, further comprising:
    each said light directed module having a light source which is illuminated when items are to be serviced from said bins, said light directed module being a light based module.

16. The RF light directed inventory system utilizing a moveable cart of claim 11, further comprising;
    a bar code scanner being connected to said RF processor panel, wherein said bar code scanner being used to scan an item with a bar code into said host computer.

17. The RF light directed inventory system utilizing a moveable cart of claim 11, further comprising:
    a printer being connected to said RF processor panel, wherein said host computer printing a message at said printer.

18. An RF light directed inventory system utilizing a moveable cart comprising:
    a host computer;
    a host RF receiver/transmitter which communicates with said host computer;
    an RF processor panel which communicates with said host RF receiver/transmitter, said RF processor panel having an RF receiver transmitter and an RF processor board, said RF receiver/transmitter receiving an order from said host RF receiver/transmitter, said RF processor board decoding said order into a plurality of light based module addresses and a plurality of item quantities, each said item quantity corresponding to each said light based module address;
    a moveable cart having a plurality of light based modules, each light based module having a corresponding bin, said plurality of light based modules which are to be serviced emitting light and displaying the number of items to be serviced, a button on said light based modules being pressed when said bin is filled, wherein no further communication being required between said host computer and said at least one RF processor panel until a new order is received; and
    wherein said RF panel receiving a batch order and not requiring communication with said host computer until said batch order is completed.

19. The RF light directed inventory system utilizing a moveable cart of claim 18, further comprising:
    at least one rack, each said rack containing a plurality of light based modules and corresponding bins, each said rack having an RF processor panel which communicates with said host RF receiver/transmitter, said at least one RF processor panel receiving an order from said host RF receiver/transmitter;
    said plurality of light based modules of said rack which are to be serviced displaying the number of items to be serviced from a corresponding bin, a button on said light based modules of said rack being pressed when said bin is serviced;
    wherein transfers between said bins in said rack and said bins in said moveable cart being indicated by the number display of each said light based module.

20. The RF light directed inventory system utilizing a moveable cart of claim 18, further comprising:
    a bar code scanner being connected to said RF processor panel, wherein said bar code scanner being used to scan an item with a bar code into said host computer, and
    a printer being connected to said RF processor panel, wherein said host computer printing a message at said printer.

* * * * *